United States Patent [19]
Niebylski

[11] Patent Number: 5,194,338
[45] Date of Patent: Mar. 16, 1993

[54] PRECERAMIC COMPOSITION CONTAINING SILICON BASED POWDER

[75] Inventor: Leonard M. Niebylski, Birmingham, Mich.

[73] Assignee: Ethyl Corporation, Richmond, Va.

[21] Appl. No.: 660,182

[22] Filed: Jan. 24, 1991

Related U.S. Application Data

[63] Continuation-in-part of Ser. No. 164,012, Mar. 4, 1988, and a continuation-in-part of Ser. No. 272,258, Nov. 17, 1988, abandoned.

[51] Int. Cl.$^5$ ................................................ B32B 9/04
[52] U.S. Cl. .................................... 428/446; 428/447; 524/104; 524/424; 524/439; 524/490; 524/588; 524/592
[58] Field of Search ................ 428/446, 447; 524/104, 524/424, 439, 404, 490, 588, 592

[56] References Cited

U.S. PATENT DOCUMENTS

| | | | |
|---|---|---|---|
| 4,397,828 | 8/1983 | Seyferth et al. | 423/344 |
| 4,482,669 | 11/1984 | Seyferth et al. | 524/442 |
| 4,645,807 | 2/1987 | Seyferth et al. | 525/474 |
| 4,650,837 | 3/1987 | Seyferth et al. | 525/478 |
| 4,659,850 | 4/1987 | Arai et al. | 556/409 |
| 4,720,532 | 1/1988 | Seyferth et al. | 528/28 |
| 5,066,734 | 11/1991 | Colombier | 501/92 X |
| 5,100,844 | 3/1992 | Niebylski | 501/92 X |

*Primary Examiner*—Peter A. Nelson
*Attorney, Agent, or Firm*—Patricia J. Hogan

[57] ABSTRACT

Preceramic compositions which have particular utility in providing protective ceramic coatings on carbonaceous and other normally oxidizable substrates are prepared by dispersing about 0.4–3.0 parts by weight of a ceramic powder selected from silicon carbide, silicon nitride, and mixtures thereof with one another and/or with up to about 90% by weight of (1) a metal boride or (2) a mixture of a metal boride and zirconium metal in one part by weight of a polysilazane.

13 Claims, No Drawings

PRECERAMIC COMPOSITION CONTAINING SILICON BASED POWDER

CROSS-REFERENCE TO RELATED APPLICATIONS

This application is a continuation-in-part of copending applications Ser. No. 164,012, filed Mar. 4, 1988, and Ser. No. 272,258, filed Nov. 17, 1988, now abandoned, the latter in turn being a continuation-in-part of Ser. No. 164,011, filed Mar. 4, 1988.

FIELD OF INVENTION

This invention relates to preceramic polysilazane/ceramic powder compositions and more particularly relates to such compositions which are useful in providing protective coatings.

BACKGROUND

It is known that many materials, such as carbon/carbon composites, carbon fibers, graphite, and certain metals have properties which make them attractive for use in aerospace and other applications in which their susceptibility to oxidative deterioration at elevated temperatures is a serious disadvantage. Such materials can also be damaged by heat and abrasion.

As disclosed in U.S. Pat. No. 4,397,828 (Seyferth et al.-I), U.S. Pat. No. 4,482,669 (Seyferth et al.-II), U.S. Pat. No. 4,645,807 (Seyferth et al.-III), U.S. Pat. No. 4,650,837 (Seyferth et al.-IV), U.S. Pat. No. 4,720,532 (Seyferth et al.-V), and U.S. Pat. No. 4,659,850 (Arai et al.), it is known that polysilazanes can be converted into ceramics. Seyferth et al.-II and -V teach that their polysilazanes can be used as coating materials or as binders for ceramic powders, such as silicon carbide and silicon nitride.

SUMMARY OF INVENTION

It has now been found that compositions which can be converted into thermally-stable ceramic coatings capable of protecting substrates from damage by oxidative deterioration, heat and/or abrasion are provided by intimately dispersing (A) about 0.4-3.0 parts by weight of a ceramic powder selected from silicon carbide, silicon nitride, and mixtures thereof with one another and/or with up to about 90% by weight of (1) a metal boride or (2) a mixture of a metal boride and zirconium metal in (B) one part by weight of a polysilazane.

DETAILED DESCRIPTION

The polysilazane used in the practice of the invention may be any polysilazane that is soluble in common organic solvents, such as aliphatic or aromatic hydrocarbons or dialkyl or alicyclic ethers; and it may be, e.g., a polysilazane of Seyferth et al.-I, -II, -III, -IV, or -V or Arai et al., the teachings of all of which are incorporated herein by reference. However, it is preferably a polysilazane of the type taught by Seyferth et al.-II, i.e., a polysilazane prepared by reacting an organodihalosilane, such as methyldichlorosilane, with ammonia and polymerizing the ammonolysis product with a basic deprotonation catalyst, such as potassium hydride.

Although the ceramic powder may be any of those taught above, it is preferably silicon carbide or a silicon carbide-containing mixture of powders. A particularly preferred form of silicon carbide, especially when it is used primarily to provide heat or abrasion resistance, is alpha-silicon carbide.

As already mentioned, the ceramic powder may include up to 90% by weight of a metal boride, such as the borides or silicon, hafnium, titanium, niobium, zirconium, and the rare earth metals, or a mixture of a metal boride and zirconium metal. When included, this optional component usually constitutes about 20-90%, preferably 20-50% by weight of the total ceramic powder; and it is preferably a silicon boride, i.e., silicon tetraboride and/or silicon hexaboride.

It is preferred that the ceramic powder have an average particle size of about 0.1-40 micrometers, most preferably about 0.1-10 micrometers, to facilitate the formation of a homogeneous dispersion. However, finer or coarser particles are also utilizable. The amount of ceramic powder used may be anywhere in the range of about 0.4-3.0 parts, preferably about 0.5-1.5 parts per part by weight of the polysilazane, although the smaller amounts are apt to be preferred when the powder is employed to provide heat or abrasion resistance, while the larger amounts are preferred when the objective of incorporating the powder is primarily to provide oxidation resistance.

In preparing the dispersions of the invention, the ceramic powder is added to a liquid comprising the polysilazane, e.g., to a polysilazane which is liquid per se or to a solution of a polysilazane in an organic solvent; and the mixture is agitated, e.g., by shaking or ultrasonication, to form a homogeneous dispersion. In a preferred embodiment of the invention in which the process is conducted so as to form a dispersion that is directly utilizable as a coating composition, the ceramic powder is added to a clear solution of a polysilazane to provide a dispersion having a solids content of about 5-75% by weight.

When a solvent is employed for the polysilazane, it may be any suitable organic solvent, such as hexane, heptane, and other aliphatic hydrocarbons; benzene, toluene, xylene, and other aromatic hydrocarbons; diethyl ether, tetrahydrofuran, glyme, diglyme, and other ethers; and cyclohexanone, 1-methyl-2-pyrrolidone, and other ketones. The solvent that is preferred in any particular instance is apt to depend on factors such as availability, cost, correlation between the boiling point and the temperature at which a subsequent drying step is to be performed, and the nature of the substrate on which it might be desired to coat the dispersion.

The dispersions of the invention are preceramic materials which are useful in making structural composites and other ceramic articles but which have particular utility as coating compositions for normally oxidizable materials, such as fibers, tows, hanks, mats, and composites of carbon; carbon or graphite slabs, rods, and structures; and oxidizable metals, such as magnesium, aluminum, silicon, niobium, molybdenum, lanthanum, hafnium, tantalum, titanium, tungsten, and the metals of the lanthanide and actinide series. They are especially valuable as preceramic coatings on materials which need protection from oxidative deterioration at elevated temperatures and carbonaceous materials which need protection from heat and/or abrasion.

When the compositions are to be used to provide protective ceramic coatings on substrates, the surfaces to be coated are usually cleaned prior to the application of the coating composition in order to improve the bonding of the ceramic coating to the substrate. The bonding can sometimes be further improved by pre-etching the surfaces to be coated.

The dispersions of the invention may be applied to the substrates in any suitable manner, such as spraying, swabbing, or brushing, to form coatings having the desired thickness, generally a thickness of up to about 1000 micrometers, frequently a thickness of about 50–125 micrometers. It is frequently preferred that the preceramic coating composition be applied in at least two layers to provide the desired ultimate thickness, e.g., by applying the composition in layers of about 25–100 micrometers, each layer being dried by driving off the solvent before the next layer is applied.

When temperatures as high as about 200°–250° are used to drive off high boiling solvents, some pyrolysis of the preceramic polymer is initiated during the drying of the coating compositions and further pyrolysis can be effected by continuing to heat the coating at such temperatures or slightly higher temperatures after drying has been completed. This permits the use of relatively low pyrolysis temperatures, i.e., about 200°–675° C., when incomplete pyrolysis or a long pyrolysis time is acceptable.

Although it is desirable to utilize these relatively low pyrolysis temperatures when the substrate is a comparatively low-melting metal, such as aluminum, which might not be able to withstand being subjected to higher temperatures, it is generally preferred to use higher temperatures in order to effect complete pyrolysis in a shorter time. The preferred temperatures for converting the preceramic coating to a ceramic coating are about 675°–900° C., most preferably about 825°–875°—temperatures which the aforementioned carbonaceous substrates and higher-melting metals can easily tolerate.

The pyrolysis may be delayed until the final desired thickness of preceramic coating has been deposited, but it is generally preferred to pyrolyze each one or two layers of dried preceramic coating before applying the next layer. The time required for the pyrolysis at the preferred temperatures is generally about 1–60 minutes, depending on the particular pyrolysis temperature selected. In the preferred embodiment of the invention where the coating is applied in multiple layers, each one or two of which is pyrolyzed before the application of the next layer, it is generally preferred to pyrolyze the first coat for only about five minutes and then to pyrolyze subsequent coats for longer times up to about 15 minutes.

For greater protection of the substrate, it is sometimes preferred to follow the pyrolysis with a thermal treatment of the coated substrate at about 1075°–1250° C., preferably about 1100°–1175° C., most preferably about 1125° C., in an atmosphere containing not more than a minor amount of oxygen, e.g., in a nitrogen, argon, or helium atmosphere, to make the ceramic coat more homogeneous. This treatment may be accomplished by raising the temperature in the vessel used for the pyrolysis or by transferring the coated substrate to a vessel maintained at a higher temperature; and it is preferably continued for about five minutes for the first coat and longer periods, e.g., about 15–20 minutes, for subsequent coats.

After the pyrolysis or pyrolysis/heat treatment, the coated substrate is cooled. Optimum results are obtained when this cooling is accomplished at a rate not greater than about 50° C./minute, preferably about 20°–30° C./minute, until the substrate temperature is below 500° C., at which time further cooling may be accomplished at ambient air temperature.

Although not essential, it is preferred to keep the starting polysilazane and the dispersion formed from it in a dry atmosphere until a layer of ceramic has been formed because of the susceptibility of the preceramic materials to attack by water and other compounds having active hydrogens.

The invention is particularly advantageous as a means of providing oxidation-, heat-, and abrasion-resistant coatings on carbonaceous and metal substrates, such as materials used in the aerospace industry for engine components, advanced nozzle systems, and high-temperature vehicle structures. However, particularly when the larger ceramic powder particles are employed in making the dispersions, it is also useful in providing antislip coatings on surfaces such as those on carbonaceous substrates.

The following examples are given to illustrate the invention and are not intended as a limitation thereof.

Parts mentioned in the examples are parts by weight. The polysilazane used was one prepared essentially as in Seyferth et al.-II by reacting methyldichlorosilane with ammonia in tetrahydrofuran at about 0° C., polymerizing the ammonolysis product with potassium hydride at about 0°–22° C., quenching the reaction with dimethylchlorosilane, and isolating the product.

EXAMPLE I

Preparation of Preceramic Coatings

Part A

A dispersion of 0.5 part of silicon carbide in a solution of one part of the polysilazane in four parts of xylene was thoroughly swab-coated onto smooth, clean, dry graphite coupons having nominal dimensions of about 3.8 cm × 2.5 cm × 0.3 cm. The coating was dried, heated at 100° C. for five minutes, heated to 150° C. at a rate of about 10° C./minute, held at 150° C. for 15–30 minutes, allowed to cool to room temperature, recoated and held at 150° C. for 30 minutes, heated to about 175°–185° C., maintained at that temperature for at least 15 minutes, and cooled to provide coupons having a coating thickness of about 0.08–0.1 mm.

Part B

Part A was repeated except that the silicon carbide in the dispersion was replaced with silicon nitride.

Part C

Part A was repeated except that the coating composition was a dispersion of one part of alpha-silicon carbide in a solution of one part of the polysilazane in a 7/1 mixture of xylene and 1-methyl-2-pyrrolidone.

Part D

Part C was repeated except that the ceramic powder was a 65/35 mixture of alpha-silicon carbide and silicon hexaboride.

Part E

Part C was repeated except that the ceramic powder was a mixture of 59% alpha-silicon carbide, 31.8% silicon hexaboride, and 9.1% zirconium metal.

EXAMPLE II

Pyrolysis and Thermal Testing

Part A

The coated coupons of Example I, Part A, were heated to 650°–700° C., held at that temperature for 15–30 minutes, cooled to room temperature, and then heated at 850° C. for 5–10 minutes. The effectiveness of the ceramic coats thus obtained in protecting the graphite surface from thermal deterioration was determined by heating the coated coupons in air at 600° C. for one hour, counting the number of pits formed on the surface, and calculating the average number of pits per square inch of three samples. This average was only 8–86 pits/square inch.

Part B

Part A was repeated except that the coated coupons used were those of Example I, Part B. The average number of pits formed on three samples of the coated coupons was 22–140 pits/square inch.

The averages determined in the preceding example compare with an average of 590–630 pits/square inch when uncoated graphite samples are subjected to the same test and an average of 500–590 pits/square inch when the ceramic coating on the graphite coupons is derived from the polysilazane alone.

EXAMPLE III

Abrasion Testing

Ceramic-coated coupons were provided as in Example II, Part A, except that the coupons that were coated with the composition were graphite coupons having nominal dimensions of 2.5 cm×2.5 cm×0.25 cm. The coupons were subjected to a succession of abrasion strokes on 320 grit emery paper, each stroke consisting of a forward stroke followed by a backward stroke. After 50 strokes the average weight loss of the coated coupons was only 0.02 g compared with a weight loss of 0.67 g when uncoated graphite coupons were subjected to the same test.

EXAMPLE IV

Pyrolysis and Oxidation Testing

Part A

The coated coupons of Example I, Part C, were heated to 165° C. at rate of 5° C./minute, held at 165° C. for 15 minutes, heated to 285° C. at a rate of 5° C./minute, held at 285° C. for 30 minutes, heated to 850° C. at a rate of 100° C./minute, held at 850° C. for 15 minutes, heated to 1250° C., held at 1250° C. for 15 minutes, and cooled to room temperature.

The effectiveness of the ceramic coats thus obtained in protecting the graphite substrate from oxidation was determined by an oxidation test. The coated specimen was mounted horizontally in a half section of a silicon carbide tube which was used as a holder and which allowed over 99% of the coupon surface to be directly exposed to hot ambient convecting air. The holder and specimen were placed in a box furnace which had been preheated to 1505° C. Every 20 minutes the holder and specimen were removed from the furnace and quenched in ambient air, the cooled specimen was weighed and remounted in its holder, and the holder and specimen were replaced in the heated furnace for additional heating in air. After one hour the oxidation weight loss was only 3.6%.

Part B

Part A was repeated except that the coated coupons used were those of Example I, Part D. The oxidation weight loss was only 0.26% after one hour and 20% after six hours.

Part C

Part A was repeated except that the coated coupons used were those of Example I, Part E. The results of the oxidation test were the same as in Part B.

The oxidation weight losses determined in the preceding example compare with oxidation weight losses of 100% after one hour when uncoated graphite coupons or graphite coupons coated only with the polysilazane were subjected to the same test.

What is claimed is:

1. An intimate dispersion of (A) about 0.4–3.0 parts by weight of a ceramic powder selected from silicon carbide, silicon nitride, and mixtures thereof with one another and/or with up to about 90% by weight of (1) a metal boride or (2) a mixture of a metal boride and zirconium metal in (B) one part by weight of a polysilazane.

2. The dispersion of claim 1 wherein the ceramic powder has an average particle size of about 0.1–10 micrometers.

3. The dispersion of claim 1 wherein the ceramic powder is silicon carbide.

4. The dispersion of claim 3 wherein the silicon carbide is alpha-silicon carbide.

5. The dispersion of claim 1 wherein the ceramic powder is silicon nitride.

6. The dispersion of claim 1 wherein the ceramic powder is a mixture of silicon carbide and silicon nitride.

7. The dispersion of claim 1 wherein the ceramic powder is a mixture of about 50–80% by weight of alpha-silicon carbide and about 20–50% by weight of silicon boride.

8. The dispersion of claim 1 wherein the ceramic powder is a mixture of about 50–80% by weight of alpha-silicon carbide and about 20–50% by weight of a mixture of silicon boride and zirconium metal.

9. The dispersion of claim 1 wherein the polysilazane is a polymer prepared by reacting an organodihalosilane with ammonia and polymerizing the ammonolysis product with a basic deprotonation catalyst.

10. The dispersion of claim 9 wherein the organodihalosilane is methyldichlorosilane and the basic catalyst is potassium hydride.

11. The dispersion of claim 1 wherein the ceramic powder is dispersed in an organic solvent solution of the polysilazane.

12. The dispersion of claim 1 containing about 0.5–1 part by weight of the ceramic powder per part by weight of the polysilazane.

13. An intimate dispersion of (A) about 0.5–1.5 parts by weight of a ceramic powder having an average particle size of about 0.1–10 micrometers and selected from silicon carbide, silicon nitride, and mixtures thereof with one another and/or with up to about 50% by weight of (1) silicon boride or (2) a mixture of silicon boride and zirconium metal in (B) an organic solvent solution of one part by weight of a polysilazane prepared by reacting methyldichlorosilane with ammonia and polymerizing the ammonolysis product with potassium hydride.

* * * * *